United States Patent [19]

Kirigaya

[11] Patent Number: 5,604,554
[45] Date of Patent: Feb. 18, 1997

[54] INDICATOR WITH FINDER OF SINGLE LENS REFLEX CAMERA

[75] Inventor: Tadayuki Kirigaya, Tokyo, Japan

[73] Assignee: Asahi Kogaku Kogyo Kabushiki Kaisha, Tokyo, Japan

[21] Appl. No.: 358,757

[22] Filed: Dec. 19, 1994

[30] Foreign Application Priority Data

Dec. 24, 1993 [JP] Japan .................................. 5-328867

[51] Int. Cl.⁶ .................................................. G03B 19/12
[52] U.S. Cl. ........................... 396/296; 396/354; 396/386
[58] Field of Search .................................... 354/219, 224, 354/225, 152, 475, 155

[56] References Cited

U.S. PATENT DOCUMENTS

| | | |
|---|---|---|
| 4,101,916 | 7/1978 | Gottschalk et al. . |
| 4,171,896 | 10/1979 | Sato et al. . |
| 4,217,050 | 8/1980 | Sato et al. . |
| 4,289,392 | 9/1981 | Kobori et al. . |
| 4,297,020 | 10/1981 | Yamada et al. . |
| 4,376,575 | 3/1983 | Someya et al. . |
| 4,560,264 | 12/1985 | Kitazawa et al. . |
| 4,949,118 | 8/1990 | Yamamoto et al. . |
| 4,977,425 | 12/1990 | Yamamoto et al. . |
| 5,170,206 | 12/1992 | Yamamoto et al. . |
| 5,218,393 | 6/1993 | Nakamura et al. . |
| 5,218,396 | 6/1993 | Morisawa . |
| 5,223,874 | 6/1993 | Kirigaya . |

FOREIGN PATENT DOCUMENTS

| | | |
|---|---|---|
| 61-249034 | 11/1986 | Japan . |
| 2-74936 | 3/1990 | Japan . |
| 3140930 | 6/1991 | Japan . |
| 3192340 | 8/1991 | Japan . |

Primary Examiner—David M. Gray
Attorney, Agent, or Firm—Greenblum & Bernstein P.L.C.

[57] ABSTRACT

An indicator within a finder of a single lens reflex camera is provided with a simple construction. The indicator may include a mirror for reflecting light of an object transmitted through a photographing lens to form an object image onto a focusing plate, an finder optical system for viewing an image of the object formed on the focusing plate, a hollow-type pentagonal mirror, and a photographing information projector for projecting a plurality of light rays onto the focusing plate to form a photographing information image. The hollow type pentagonal mirror may include a pair of roof reflecting surfaces and a third reflecting surface for reflecting light, reflected by the pair of roof reflecting surfaces, toward an eyepiece optical system. The photographing information projector may be mounted in the vicinity of the pair of roof reflecting surfaces.

22 Claims, 6 Drawing Sheets

INDICATOR WITH FINDER OF SINGLE LENS REFLEX CAMERA

BACKGROUND OF THE INVENTION

1. Field of the Invention

The present invention relates to an indicator in which photographing information is superimposed and indicated on an object image within a finder in a single lens reflex camera.

2. Description of the Related Art

The above-mentioned superimposing indicator is already known, and in a conventional superimposing indicator, a mirror which partially functions as a half mirror is provided to project photographing information onto a focusing plate through a lower portion of the half mirror, or a mirror is provided to reflect the photographing information once and project the information onto the focusing plate. However, since it is required to use the mirror partially as a half mirror in the former configuration, not only is the camera with the half mirror expensive but also the quantity of light which enters the finder fluctuates. On the other hand, in the latter configuration, it is necessary to relatively incline an image projecting lens and an information chart at a predetermined angle based on the Scheimpflug's Law, which is difficult to adjust accurately.

SUMMARY OF THE INVENTION

It is therefore an object of the present invention to provide an indicator within a finder of a single lens reflex camera with a simple construction.

Another object of the present invention is to provide an indicator with a simple construction for a single lens reflex camera having a picture image area size switching mechanism for switching a picture image area size between a standard size, i.e., 35 mm size and an elongated size, i.e., panoramic size where the indicator clearly indicates the selection of panoramic mode.

According to an aspect of the present invention, there is provided an indicator within a finder of a single lens reflex camera that may includes a mirror for reflecting light of an object transmitted through a photographing lens to form an object image onto a focusing plate, a finder optical system for viewing an object image of the object formed onto the focusing plate, a hollow-type pentagonal mirror, and a photographing information projector for projecting a plurality of light rays onto the focusing plate to form a photographing information image. The hollow type pentagonal mirror may include a pair of roof reflecting surfaces which are in the form of a Daha mirror, and a third reflecting surface for reflecting light, reflected by the pair of roof reflecting surfaces. The photographing information projector may be mounted in the vicinity of the pair of roof reflecting surfaces, toward an eyepiece optical system.

The photographing information projector is preferably mounted on a light intercepting surface connecting the pair of roof reflecting surfaces, which are in the form of a Daha mirror and the third reflecting surface to each other. Alternatively, the photographing information projector may be mounted on a rear end portion of the pair of roof reflecting surfaces on the eyepiece optical system side.

In the above-mentioned construction of the indicator, a hollow-type pentagonal mirror is used in place of a pentagonal prism made of glass, and the photographing information projector is mounted in the vicinity of the pair of roof reflecting surfaces of the hollow-type pentagonal mirror, which provides an indicator within a finder of a single lens reflex camera with a simple construction.

Furthermore, the photographing information projector according to the present invention is characterized by a light emitter, an information chart illuminated by the light emitter, and a projecting lens for forming an image of the information chart on the focusing plate.

As another aspect of the present invention, in a single lens reflex camera with the indicator, a picture image area size is variable between a 35 mm standard size and an elongated size which is more elongated than the 35 mm standard size. The indicator, and the photographing information projector indicate either a standard size mode or elongated size mode as photographing information.

Still another aspect of the present invention, is in a single lens reflex camera with the indicator in which photographing conditions such as shutter speed, F-number and picture image area size are variable. When a release button is depressed by a half step, photographing conditions are formed by the photographing information projector as the photographing information.

The present disclosure relates to subject matter contained in Japanese patent application No. 5-328867 (filed on Dec. 24, 1993) which is expressly incorporated herein by reference in its entirety.

BRIEF DESCRIPTION OF THE DRAWINGS

The present invention will be described below in detail with reference to the accompanying drawings, in which.

DETAILED DESCRIPTION OF PREFERRED EMBODIMENTS

An indicator within a finder of a single lens reflex camera according to the present invention will be explained with reference to the drawings. In such a single lens reflex camera, photographing conditions such as shutter speed, F-number, and picture image area size may be variable.

Figure 1:
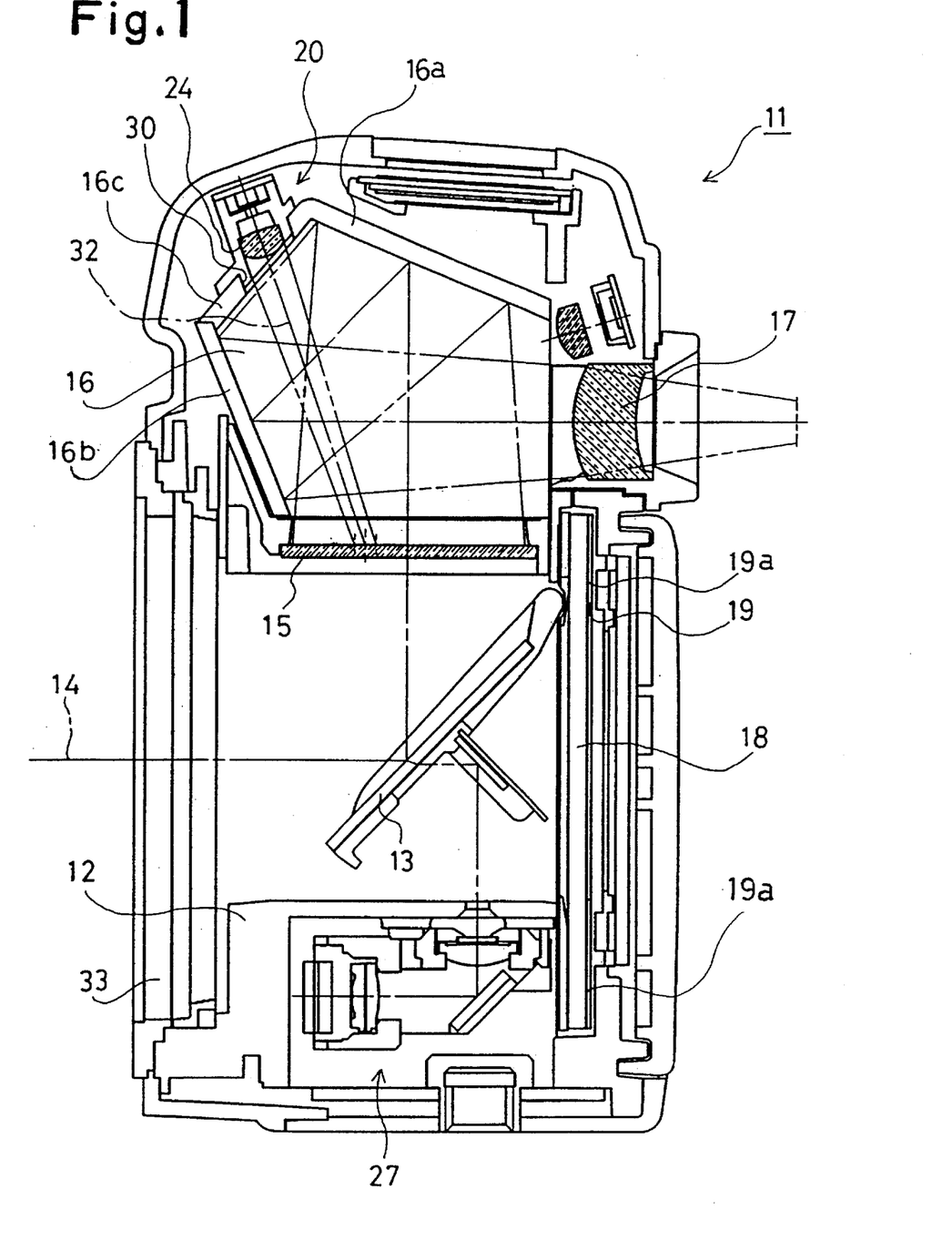
FIG. 1 is a lateral cross-sectional view of an overall camera body of a single lens reflex camera to which an indicator within a finder according to the first embodiment of the present invention is applied.

FIG. 1 shows the indicator according to a first embodiment of the present invention. As is well known, the single lens reflex camera 11 is provided with a quick return mirror 13 supported by the mirror box 12. The quick mirror 13 is normally supported in a viewing position where the mirror 13 is inclined at 45 degrees with an optical axis 14 of a photographing lens to introduce a plurality of light rays from an object to a focusing plate 15. On the other hand, upon photographing the object, the quick return mirror 13 retracts below the lower surface of the focusing plate 15, so that the mirror is rotated out of the path of the optical axis of the photographing lens, which permits the rays of light to reach the film surface through a focal plane shutter 18. When the quick return mirror 13 is in the viewing position, the image of the object is inverted by the mirror 13 and a hollow-type pentagonal mirror 16 rotates the vertical and horizontal directions to obtain an erect real image through and eyepiece lens 17.

The hollow-type pentagonal mirror 16 is provided with a pair of roof reflection surfaces (walls) which are in the form of a Daha mirror 16a of which two surfaces intersect at right angles and are symmetrical in the direction perpendicular thereto; a third reflection surface (wall) 16b an extension of the third reflection surface 16b, intersects with an extension of a ridge line of the pair of roof reflection surfaces 16a at an angle of 45 degrees; and a triangular surface (wall) 16c for connecting the pair of roof reflection surfaces 16a and the third reflection surface 16b to interrupt light.

An aperture 19 is situated behind the focal plane shutter 18 in the single lens reflex camera 11 to determined a 35 mm photographing size as a standard size. A pair of vertically moving light intercepting plates 19a are disposed between the focal plate shutter 18 and the aperture 19 in an optical axis direction. The panoramic size of aperture 19 is obtained when the light intercepting plates 19a move towards each other to partly cover the upper and lower edges of the aperture 19. The light intercepting plates 19a are retracted outside the aperture 19 to define the standard 35 mm aperture. Since any known moving mechanism of the light intercepting plates may be used and the subject of the present invention is not directly addressed to the moving mechanism of the light intercepting plates 19a, a detailed explanation therefor is omitted. A known AF sensor unit 27 is mounted to the lower portion of the mirror box 12, and a lens mount portion 33 is provided in front of the mirror box 12 to mount an interchangeable lens.

Photographing information indicating unit 20 of the indicator within the finder according to the present invention is attached to the light intercepting wall 16c of the hollow-type pentagonal mirror 16. Through hole 30, in communication with the inside of the pentagonal mirror 16,is formed on the light intercepting plate 16c, and the photographing information indicator unit 20 is secured so that the projecting lens 24 is directed to the inside of the pentagonal mirror 16 from the through hole 30.

Figure 2:
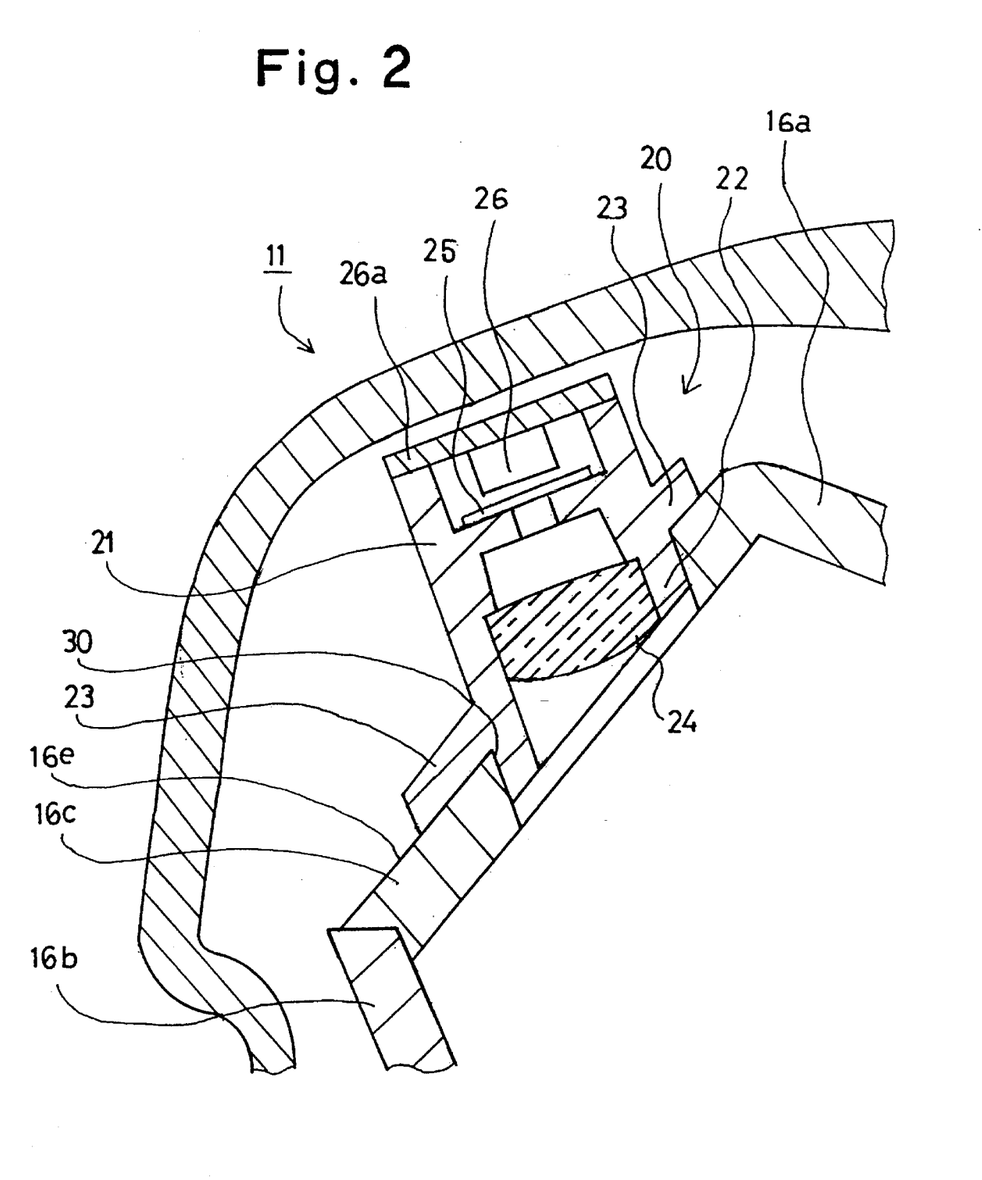
FIG. 2 is an enlarged cross-sectional view of a primary portion of the camera body with the indicator.

FIG. 2 is an enlarged view of the photographing information indicating unit 20 and the periphery thereof. An indicator body 21 includes a cylindrical portion 22 inserted into hole 30, and a flange 23 formed above the inserted portion 22 along the outer surface 16e of the light intercepting wall 16c. The position of the photographing information indicating unit 20 relative to the light intercepting wall 16c is determined by the positions of through hole 30, cylindrical portion 22, and flange 23. Indicator body 21 is secured to light intercepting surface 16c by known securing means such as screws and bonding agent. The body 21 may be integrally formed with light intercepting wall 16c.

Figure 3:
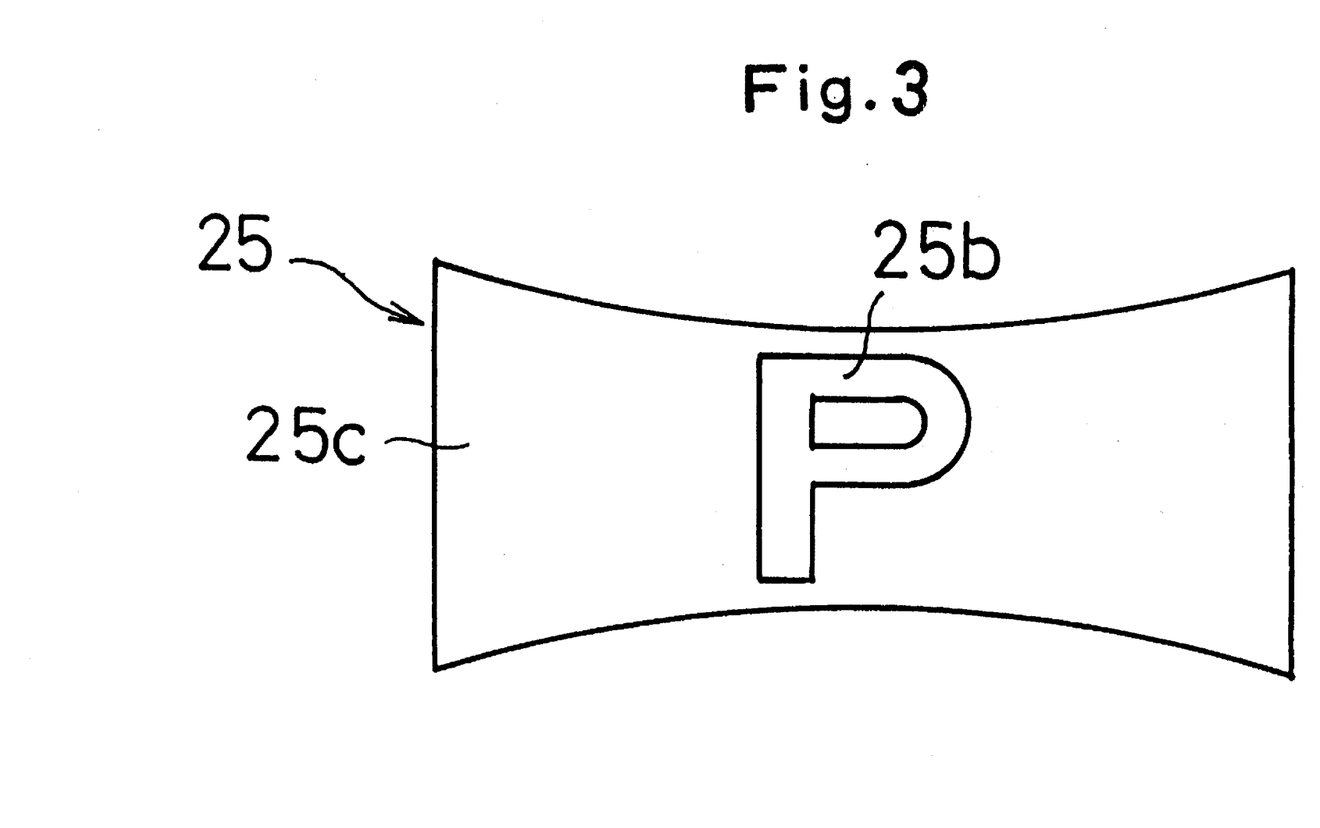
FIG. 3 is a front view of an information chart as an example.

Indicator body 21 is provided with a projecting lens 24, an information chart 25 and an LED 26 in this order from below. Projecting lens 24 is a small single lens and the optical axis 32 thereof is substantially parallel with the third reflection surface 16b. The information chart 25 is made of a transparent body 25c with a mark 25b in the form of a letter "P" at the center of thereof as illustrated in FIG. 3. The mark 25b is made of a low transmittance material. The LED 26 is made of a red light emitting diode secured to a substrate 26a which is fixed to the upper end portion of the body 21.

Figure 4:
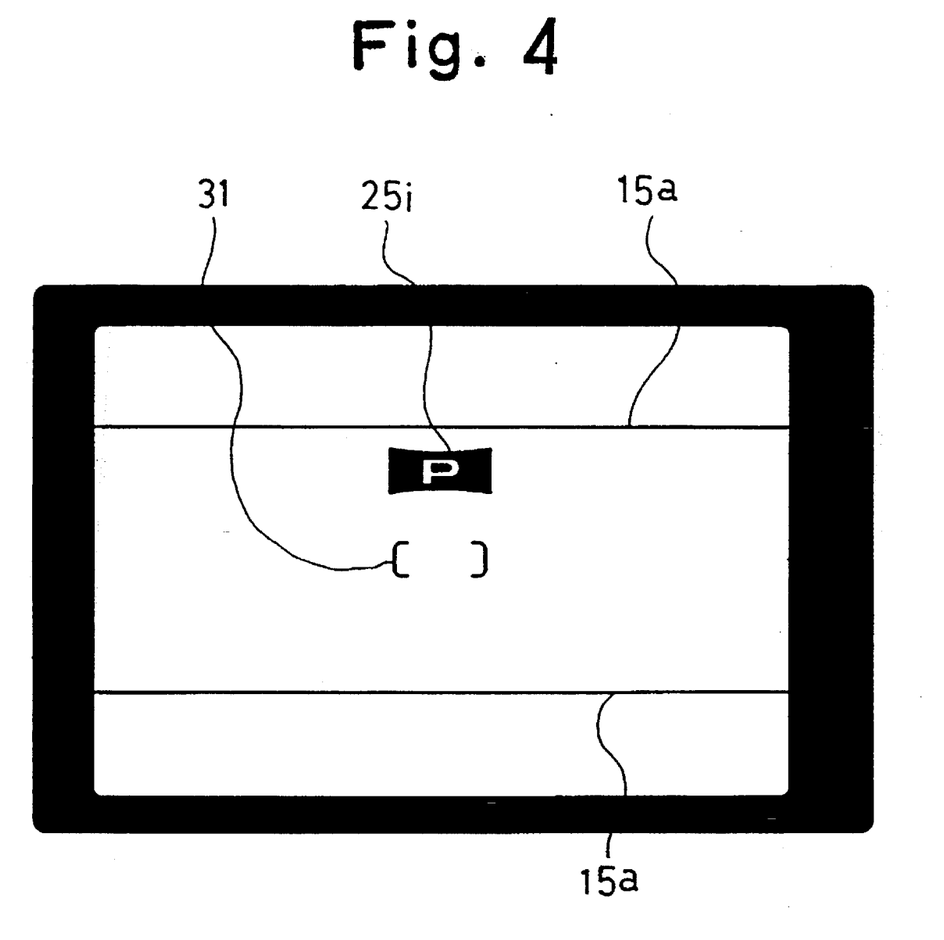
FIG. 4 is a front view of a focusing plate for indicating the position of the projected photographing information according to the first embodiment of the present invention.

FIG. 4 shows an example of the position of the projected image 25i of the information chart 25 on the focusing plate 15. The image 25i is located inside panoramic size frame 15a which defines a field of view for panoramic photographing range formed on the focusing plate 15. The focusing plate 15 has an AF focusing zone mark 31 at the center of the field of view. The position of the projected image 25i is not limited to the position indicated in FIG. 4, but is determined at a further recognizable portion on the focusing plate 15 by shifting the optical axis 32 of the photographing information indicating unit 20.

In the single lens reflex camera 11 with the above-mentioned construction, the light intercepting plates 19a are retracted from the aperture 19 at the 35 mm standard size mode. In this mode, even if a photometering switch is actuated when a release button is depressed by a half step, no light is emitted from the LED 26 of the photographing information indicating unit 20. In other words, no image 25i of the information chart 25 is projected on the focusing plate 15 in the 35 mm standard size mode.

On the other hand, when the panoramic size mode is selected, the light intercepting plates 19a are moved towards each other to partly cover the upper and lower edges of the aperture 19 to define the panoramic size of the picture plane. Under this condition, when the photometering switch is actuated by depressing the release button by a half step, light is emitted from the LED 26 of the photographing information indicating unit 20 to project the image 25i of the information chart 25 onto the focusing plate 15. This ensures that a photographer is able to recognize the selection of the panoramic mode through the indication of the image 25i within the finder as illustrated in FIG. 4. In this embodiment illustrated in the figures, the circumferential portion of transparent body 25c of the information chart 25 that has a higher transmittance than that of the mark 25b is indicated by red color through the red LED 26, and the letter "P" with a low transmittance at the center of the information chart 25 is indicated in black. As a result, the photographer clearly views the black image of the letter "P" appearing on the red background. After that, when the shutter button is fully depressed, LED 26 is turned off, and then, the shutter 18 is open to execute the exposure. That is, the LED 26 is turned off before the exposure, which has no influence upon the exposure.

Figure 5:
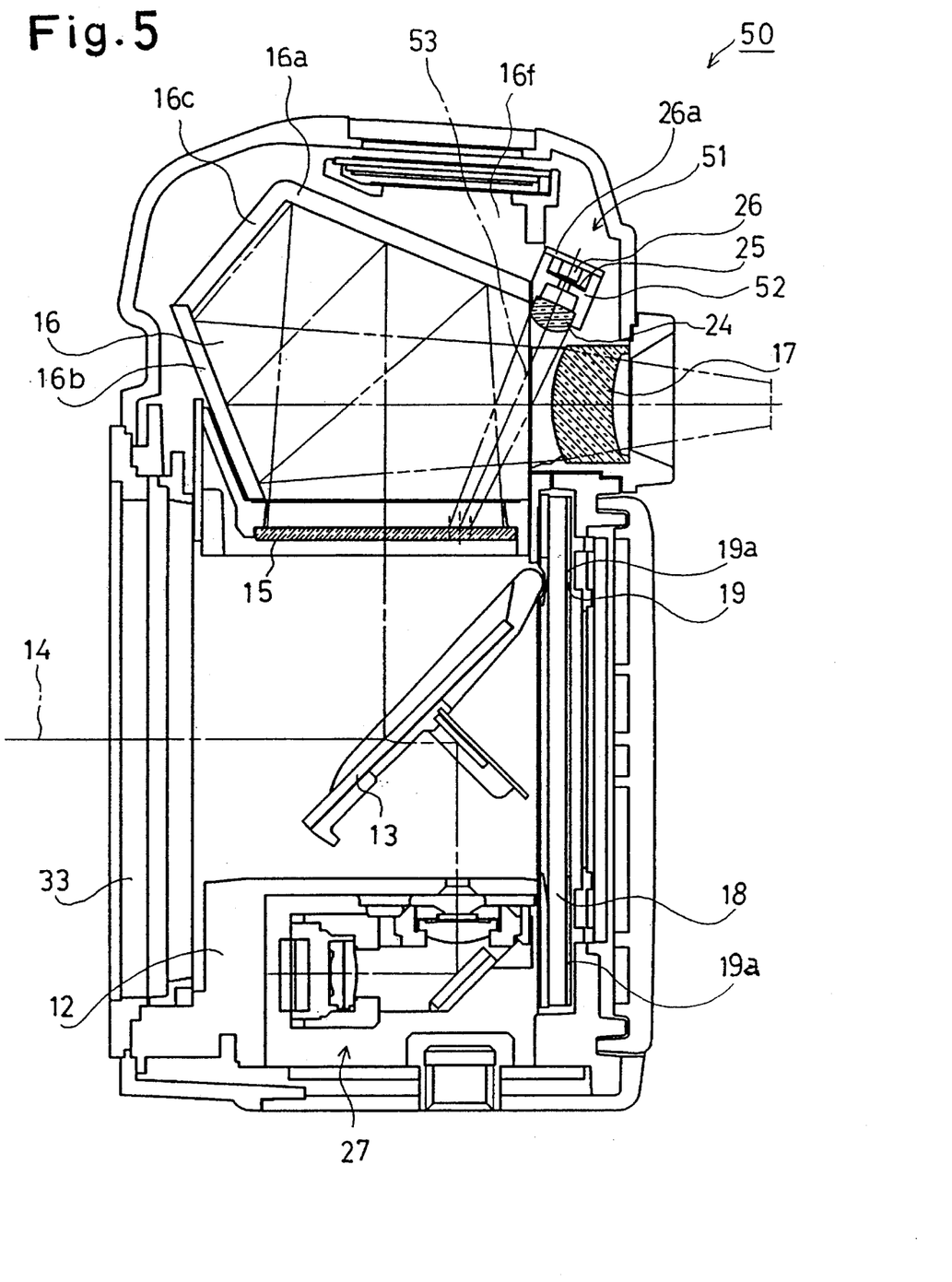
FIG. 5 is a lateral cross-sectional view of an overall camera body of a single lens reflex camera to which an indicator within a finder according to the second embodiment of the present invention is applied.
Figure 6:
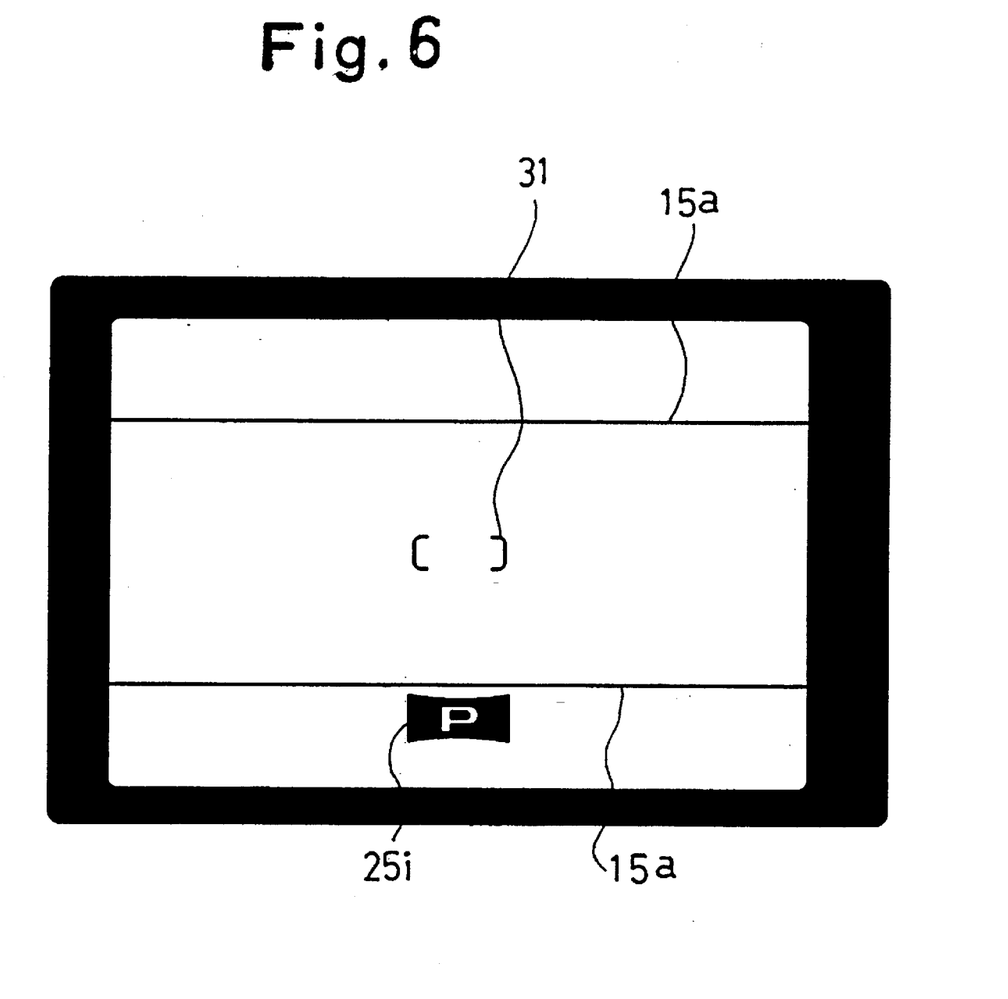
FIG. 6 is a plan view of a focusing plate for indicating the position of the projected photographing information according to the second embodiment of the present invention.

FIGS. 5 and 6 show a single lens reflex camera according to the second embodiment of the present invention. In this embodiment, members substantially the same as those in the first embodiment are provided with the same reference symbols. The single lens reflex camera 50 according the second embodiment is characterized in that a photographing information indicating unit 51 is attached to a rear end portion 16f of the pair of roof reflection walls 16a. The photographing information indicating unit 51 has the same function as the photographing information indicating unit 20 in the first embodiment, and is provided with a body 52, a projecting lens 24, an information chart 25 and a LED 26. The body 52 is secured to the rear end portion 16f of the roof reflection surfaces 16a with the projecting lens 24 directing to the inside of the hollow-type pentagonal mirror 16 through known securing means such as screws and bonding agents, or may be integrally formed with the rear end portion 16f of the roof reflection walls 16a.

FIG. 6 illustrates another example of the position of the projected image 25i of the information chart 25 on the focusing plate 15. The image 25i is located at a portion below the center of the focusing plate 15 so as to easily be recognizable to the photographer. The position of the image 25i which is projected is not limited to the position indicated in FIG. 6, as similarly mentioned regarding FIG.

The rear end of the hollow-type pentagonal mirror 16 in front of the eyepiece lens 17 is open. Therefore, the photographing information indicating unit 51 is not necessarily attached to the rear end portion 16f of the roof reflection surfaces 16a directly, but may alternatively be secured to a part of the camera body (not shown) adjacent to the rear end portion 16f.

As described above, in the first and second embodiments, the image 25i of the information chart 25 is "P", but it is possible to use other characters, words or the like, for example "PANORAMA" so that the photographer can recognize the selection of the panoramic mode though the indication of the image within the finder.

As described above, in the first and second embodiments, the present invention is applied to the indication of the selection of the panoramic mode, but is applicable to the indication of other photographing information. For instance, the information chart 25 can be made of an LCD which allows information such as shutter speed and aperture scale to be displayed.

As described above, according to the present invention, a photographing information indicator is attached on the side of a hollow-type pentagonal mirror in consideration of the construction of a hollow-type pentagonal mirror to provide an indicator within a finder of a single lens reflex camera with a simple construction. The present invention is advantageously applicable, in particular, to a single lens reflex camera with a variable picture image area size to simply and clearly indicate the selection of the panorama size mode.

I claim:

1. An indicator within a finder of a single lens reflex camera, comprising:
    a mirror for reflecting light of an object transmitted through a photographing lens to form an object image onto a focusing plate;
    a finder optical system for viewing said object image formed on said focusing plate;
    a hollow-type pentagonal mirror comprising a pair of roof reflecting surfaces and a third reflecting surface for reflecting light, reflected by said pair of roof reflecting surfaces, towards an eyepiece optical system; and
    a photographing information projector integrally provided to said pentagonal mirror and mounted in the vicinity of said pair of roof reflecting surfaces for directly projecting a plurality of light rays onto said focusing plate to form a photographing information image.

2. The indicator within a finder of a single lens reflex camera as claimed in claim 1, said hollow-type pentagonal mirror further comprising a light intercepting surface for connecting said pair of roof reflecting walls and said third reflecting surface, said photographing information projector being attached to said light intercepting surface.

3. The indicator within a finder of a single lens reflex camera as claimed in claim 1, wherein said photographing information projector is attached to one of a rear end portion of said pair of roof reflecting surfaces and a portion adjacent to said rear end portion.

4. The indicator within a finder of a single lens reflex camera as claimed in claim 1, said photographing information projector comprising: a light emitter; an information chart illuminated by said light emitter; and a projecting lens for forming an image of said information chart on said focusing plate.

5. The indicator within a finder of a single lens reflex camera according to claim 1, said finder optical system, said hollow-type pentagonal mirror and said photographing information projector positioned on a single side of said focusing plate opposite to said mirror for reflecting light.

6. The indicator within a finder of a single lens reflex camera according to claim 1, said photographing information projector comprising a source of photographing information self contained within said finder.

7. The indicator within a finder of a single lens reflex camera according to claim 1, said photographing optical projector directly projecting said plurality of light rays onto a surface of said focusing plate opposite said mirror for reflecting light.

8. An indicator within a finder of a single lens reflex camera in which light transmitted through a photographing lens is reflected by a mirror located in a viewing position to form an object image onto a focusing plate that can be viewed through a finder optical system, and in which a picture image area size is variable between a standard image size and an elongated image size more elongated relative to height, than said standard image size, said indicator comprising:
    a hollow-type pentagonal mirror comprising a pair of roof reflecting surfaces and a third reflecting surface for reflecting light, reflected by said pair of roof reflecting surfaces, toward an eyepiece optical system;
    an elongated size frame for indicating the elongated image size provided in said finder optical system; and
    a photographing information projector integrally provided to said pentagonal mirror and mounted in the vicinity of said pair of roof reflection surfaces for directly projecting a plurality of rays onto said focusing plate to form a photographing information image.

9. The indicator within a finder of a single lens reflex camera as claimed in claim 8, said hollow-type pentagonal mirror further comprising a light intercepting surface for connecting said pair of roof reflecting surfaces and said third reflecting surface, said photographing information projector being attached to said light intercepting surface.

10. The indicator within a finder of a single lens reflex camera as claimed in claim 9, wherein said photographing information projector is attached to one of a rear end portion of said pair of roof reflecting walls and a portion adjacent to said rear end portion.

11. The indicator within a finder of a single lens reflex camera as claimed in claim 8, wherein said photographing information projector comprising: a light emitter; an information chart illuminated by said light emitter; and a projecting lens for forming an image of said information chart on said focusing plate.

12. The indicator within a finder of a single lens reflex camera as claimed in claim 8, wherein said elongated size frame comprises a panorama size, and said photographing information projector indicates one of "P" and "PANORAMA" as information.

13. The indicator within a finder of a single lens reflex camera according to claim 8, said finder optical system, said hollow-type pentagonal mirror and said photographing information projector positioned on a single side of said focusing plate opposite to said mirror for forming an object image.

14. The indicator within a finder of a single lens reflex camera according to claim 8, said photographing information projector comprising a source of photographing information self contained within said finder.

15. The indicator within a finder of a single lens reflex camera according to claim 5, said photographing optical projector directly projecting said plurality of light rays onto a surface of said focusing plate opposite said mirror for forming an object image.

16. An indicator within a finder of a single lens reflex camera in which photographing conditions, including at least one of shutter speed, F-number and picture image area size are variable, and light transmitted through a photographing lens is reflected by a mirror located in a viewing position to form an object image on a focusing screen that can be viewed through a finder optical system, said indicator comprising:

a hollow-type pentagonal mirror comprising a pair of roof reflecting surfaces and a third reflecting surface for reflecting light, reflected by said pair of roof reflecting surfaces, toward an eyepiece optical system;

a photographing information projector integrally provided to said pentagonal mirror and mounted in the vicinity of said pair of roof reflection surfaces for directly projecting a plurality of light rays onto said focusing plate to form a photographing information image; and changing means for changing said photographing conditions;

wherein, when a release button of said single lens reflex camera is depressed by a half step, photographing conditions changed by said changing means are formed as said photographing information by said photographing information projector.

17. The indicator within a finder of a single lens reflex camera as claimed in claim 16, said hollow-type pentagonal mirror further comprising a light intercepting surface for connecting said pair of roof reflecting surfaces and said third reflecting surface, said photographing information projector being attached to said light intercepting surface.

18. The indicator within a finder of a single lens reflex camera as claimed in claim 16, wherein said photographing information projector is attached to one of a rear end portion of said pair of roof reflecting surfaces and a portion adjacent to said rear end portion.

19. The indicator within a finder of a single lens reflex camera as claimed in claim 16, wherein said photographing information projector comprises: a light emitter; an information chart illuminated by said light emitter; and a projecting lens for forming an image of said information chart on said focusing plate.

20. The indicator within a finder of a single lens reflex camera according to claim 16, said finder optical system, said hollow-type pentagonal mirror and said photographing information projector positioned on a single side of said focusing plate opposite to said mirror for forming an object image.

21. The indicator within a finder of a single lens reflex camera according to claim 16, said photographing information projector comprising a source of photographing information self contained within said finder.

22. The indicator within a finder of a single lens reflex camera according to claim 16, said photographing optical projector directly projecting said plurality of light rays onto a surface of said focusing plate opposite said mirror for forming an object image.

* * * * *

UNITED STATES PATENT AND TRADEMARK OFFICE
CERTIFICATE OF CORRECTION

PATENT NO. : 5,604,554
DATED : February 18, 1997
INVENTOR(S) : T. KIRIGAYA

It is certified that error appears in the above-indentified patent and that said Letters Patent is hereby corrected as shown below:

At column 7, line 2 (claim 15, line 2), change "claim 5" to ---claim 8---.

Signed and Sealed this

Twenty-second Day of April, 1997

Attest:

BRUCE LEHMAN

*Commissioner of Patents and Trademarks*

*Attesting Officer*